United States Patent [19]

Fukuwatari

[11] Patent Number: 4,652,800
[45] Date of Patent: Mar. 24, 1987

[54] MOVING OBJECT STOP CONTROL METHOD BY A LINEAR MOTOR

[75] Inventor: Ichiro Fukuwatari, Tochigi, Japan

[73] Assignee: Hitachi Kiden Kogyo Kabushikikaisha, Amagasaki, Japan

[21] Appl. No.: 707,282

[22] Filed: Mar. 1, 1985

[30] Foreign Application Priority Data

Mar. 28, 1984 [JP] Japan .................................. 59-61902

[51] Int. Cl.[4] .......................................... H02K 41/00
[52] U.S. Cl. ....................................... 318/135; 310/13
[58] Field of Search ................... 310/12–14; 318/121, 135; 104/290–298, 302, 303

[56] References Cited

U.S. PATENT DOCUMENTS

| | | | |
|---|---|---|---|
| 2,112,264 | 3/1938 | Bowles et al. | 310/134 |
| 3,225,228 | 12/1965 | Roshala | 310/12 |
| 3,462,883 | 8/1969 | Reeks et al. | 318/135 X |
| 3,621,349 | 11/1971 | Reyx | 318/135 |
| 3,792,665 | 2/1974 | Nelson | 318/135 X |
| 3,891,907 | 6/1975 | Lenzkes et al. | 318/135 X |
| 4,090,113 | 5/1978 | Ogishi | 318/135 X |
| 4,463,290 | 7/1984 | Asakawa et al. | 318/135 |

*Primary Examiner*—Donovan F. Duggan
*Attorney, Agent, or Firm*—Armstrong, Nikaido, Marmelstein & Kubovcik

[57] ABSTRACT

A moving object stop control method using a linear motor comprising a movable element mounted to the moving object and a pair of stators disposed to put therebetween the stop position of the moving object, the pair of stators being applied with exciting voltages opposite phase to each other, the exciting voltages each being reduced of amplitude only by a desired magnitude intermittently with the predetermined timing.

1 Claim, 5 Drawing Figures

MOVING OBJECT STOP CONTROL METHOD BY A LINEAR MOTOR

BACKGROUND OF THE INVENTION (1) Field of the Invention

This invention relates to a stop control method for a moving object by use of a thrust by a linear motor.

(2) Description of the Prior Art

Conventionally, in order to stop a moving object driven by the linear motor, a method has been adopted which detects the direction of movement, position, speed, etc. to control energization for the linear motor and generate a braking fonce, thereby stopping the moving object at the desired position. Such method, however, requires complicated apparatus and is difficult to exactly stop the moving object at the desired position, and especially when a running resistance is low, an overshoot after occurs, so that the moving object hunts to find the stop position, thereby having in convenience of taking much time to stop the same.

Also, other methods, such as the use of a stopper or a mechanical brake, have been used, which are defective in that the moving object is subjected to an impact, or dust is produced in these methods, thereby being not usable at a place where dust should be expelled.

SUMMARY OF THE INVENTION

In the light of the above problem, this invention has been designed. An object thereof is to provide a stop control method for stopping a moving object by a linear motor in a simple way without adding any complicated device. This invention is characterized in that a pair of stators of linear motor are disposed in proximity to the moving object stop position in relation of longitudinally sandwiching the stop position between the stators and are applied with exciting voltages opposite phase to each other so that the directions of phase rotation are opposite to each other, and the amplitude of exciting voltage is reduced only by a desired magnitude intermittently with the predetermined timing on the basis of a signal from a moving object detection sensor placed sideways of the stop position of moving object, whereby the moving object is adapted to stop with accuracy at the stop position without creating hunting.

The above as well as other object of the invention will become more apparent in the detailed descriptions which follow.

DESCRIPTION OF THE PREFERRED EMBODIMENT

Figure 1:
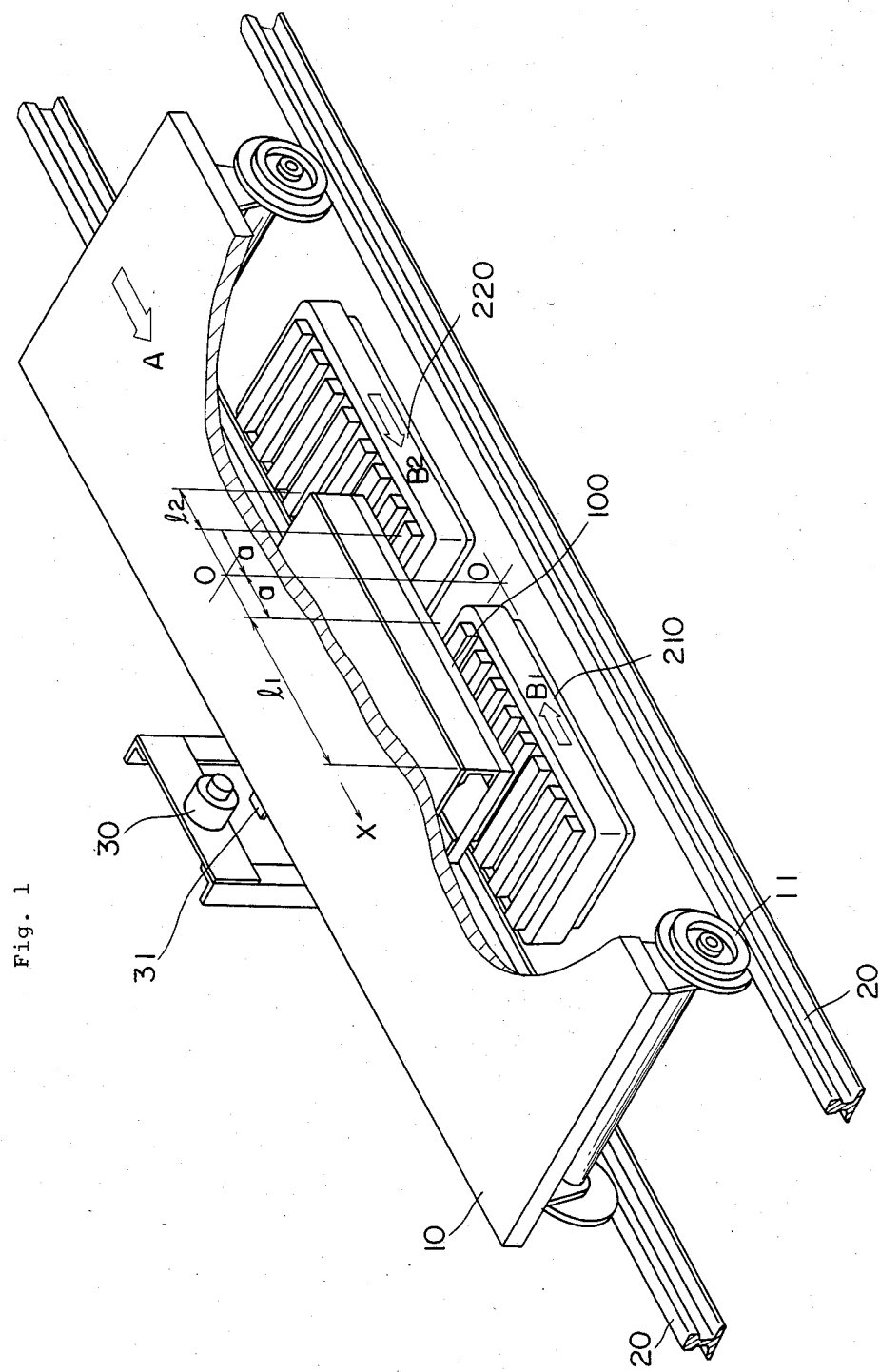
FIG. 1 is a perspective view of an apparatus for carrying out an embodiment of a moving object stop control method of the invention.

Referring to FIG. 1, reference numeral 10 designates a moving object, 11 designates a wheel, and 20 designates rails on which the moving object runs, 100 designates a movable element (rotor) of a linear motor fixed onto a substantially central portion at the lower surface of moving object 10, which is opposite to stators to be discussed below and constitutes together therewith the linear motor.

Furthermore, reference numerals 210 and 220 designate stators at the linear motor, which are disposed before and behind the stop position and spaced by distances a therefrom respectively as shown, and 30 designates a moving object detection sensor using a proximity switch in this embodiment, disposed sideways of the stop position 0, and detecting passage of a sensor striker 31 fixed at a substantially central portion of the lateral surface of moving object 10.

Next, explanation will be given on operation for the method of the invention.

The stators 210 and 220 are energized by polyphase alternate exciting voltage opposite phase in the phase rotation directions as shown by the arrows B1 and B2, the movable element 100 opposite to the stators 210 and 220 generating a thrust in the respective directions of the arrows B1 and B2 as the same as the above.

The magnitude of thrust is proportional to an arear of movable element 100 overlapping in part with the stators 210 and 220. When lengths of the overlapping portions at the moving element 100 from both end faces thereof are represented by L1 and L2 and the thrust per unit length by K, a thrust F1 in the direction of the arrow B1 given to the moving element 100 from the stator 210 and that F2 in the direction of that B2 from the stator 220 are given in F1 =K·L1 and F2=K·L2 respectively.

Accordingly, the movable element 100 subjected to the centripetal forces F1 and F2 proportional to the distance leads to generation of free vibration around the stop point 0.

When mass of moving object 10 including the movable element 100 is represented by m, the following equation of motion is obtained:

$$md^2x/dt^2 = -Kx \qquad (1)$$

where L1−L2 =x

Now, assuming that the moving object 10 is accelerated at the adjacent station and passes through the stop position 0 at the speed $v_0$ in the direction of the arrow A, an initial condition at x=0 is given by dx/dt=0, so that the equation (1) is solved by use of the above to obtain the following equation.

$$X = \frac{mv_0}{\sqrt{mK}} \cdot \cos\left(\sqrt{\frac{K}{m}}\, t + \phi\right) \qquad (2)$$

where $\phi$ is the integration constant.

In a case where the moving object 10, which runs in the direction of the arrow A, is stopped by the thrust F1 in the reverse direction generated by the stator 210, and then moves reversely, the largest overlap distance $L_0$ is the amplitude of free vibration, the amplitude being decided by the mass m of moving object 10, approach speed $v_0$, and thrust K per unit length generated by the stator 210 and is given from the equation (2) in the following equation:

$$L_0 = \frac{mV_0}{\sqrt{mK}} \qquad (3)$$

Also, a cycle period T depends on m and K as given in the following equation:

$$T = 2\pi/\sqrt{K/m} \quad , \qquad (4)$$

but is not affected by the amplitude and is of constant value.

Figure 2:
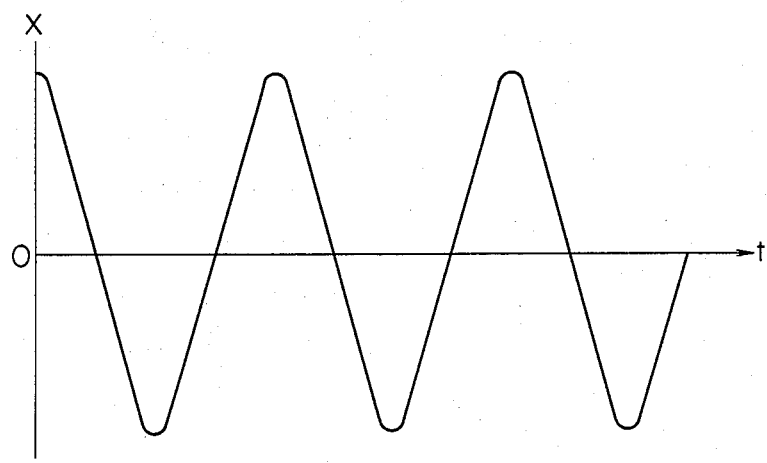
FIG. 2 is a graph showing vibrations around the moving object stop position.

Referring to FIG. 2, the above-mentioned vibration in this condition is damped only by running resistance to result in that it takes much time to stop the moving object 10.

When the moving object 10 stops by the reverse thrust and begins to turn back, the amplitude of exciting voltage of stator 210 is reduced to reduce the generated thrust and acceleration applied to the moving object 10, the amplitude of exciting voltage is restored after the movable element 100 passes at the center thereof through the stop position, and the thrust in the reverse direction is held to promote the braking action, thereby rapidly damping the vibration to enable the moving object to be stopped.

Figure 3:
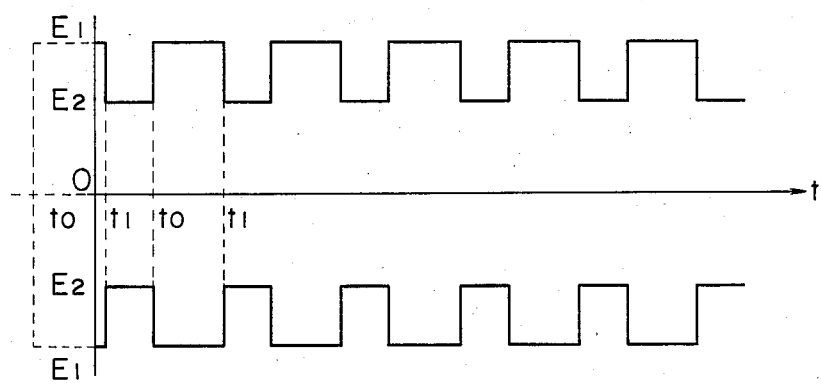
FIG. 3 is a graph showing variations in exciting voltage on stators at a linear motor.

In FIG. 3 showing a change in the exciting voltage at the stator, in which the exciting voltage is reduced from E1 to E2 between the time to of passage of the center of moving object 10 through the stop position 0 and that $t_1$ of its turn back after passing the maximum amplitude, and then the exciting voltage is restored to E1 at the time of passage again through the stop position, which is to be repeated.

Figure 4:
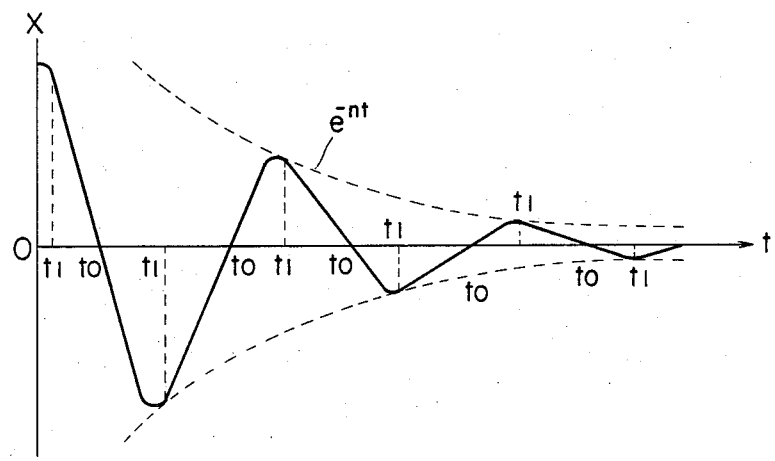
FIG. 4 is a graph showing decrease in amplitude of exciting voltage.

Referring to FIG. 4, the damped amplitude shows that the moving object can reasonably be stopped to prevent the occurance of hunting.

Furthermore, when the moving object 10 stops, the overlap distances L1 and L2 are equal to each other to allow the moving object 10 to stop at the center in accurate coincidence with the stop positions.

Figure 5:
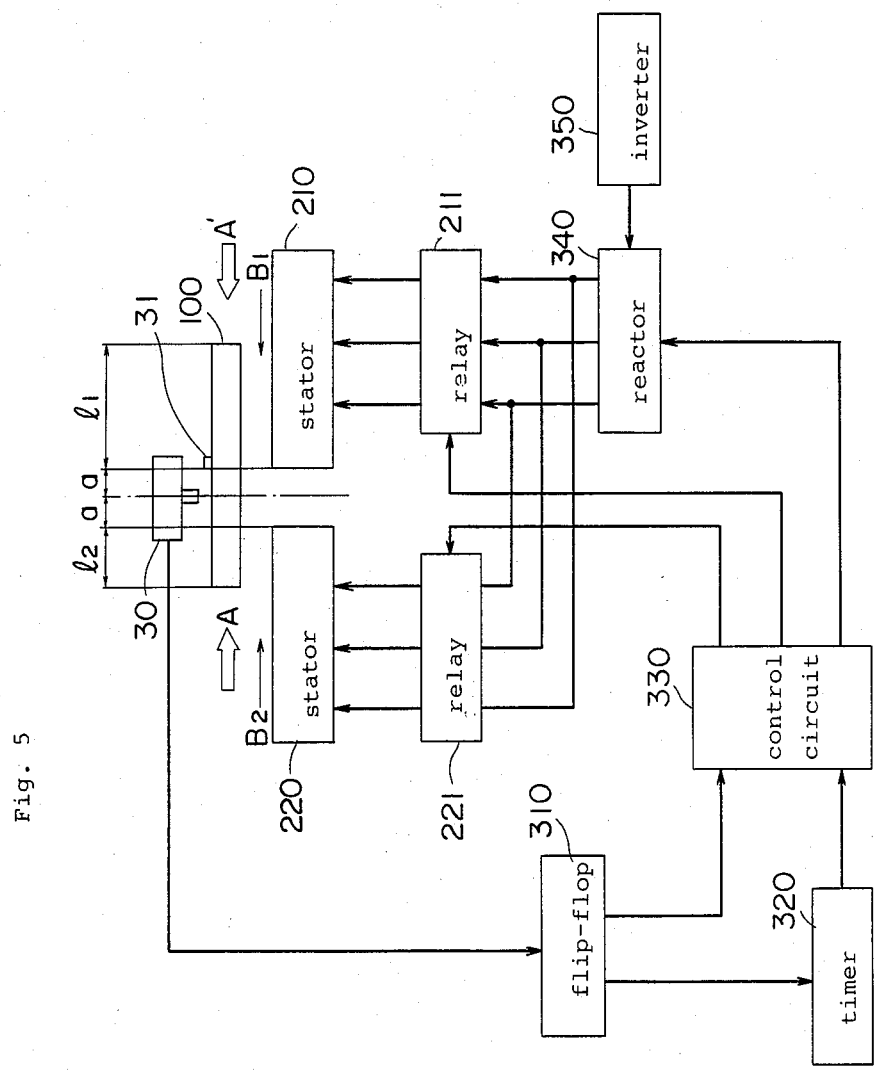
FIG. 5 is a block diagram of a control circuit.

Referring to FIG. 5, the stators 210 and 220 are applied wiht 3-phase alternate voltage in the reverse phase rotation from an inverter 350 through a reactor 340 and relay circuits 211 and 221, thereby generating the opposite thrusts in the directions of the arrows B1 and B2, so that the movable element 100 runs in the direction of the arrow A and stops to overlap at the end with the stator 210 by the distance L1 only and then turns back.

The sensor striker 31, when it passes the front of moving object detection sensor 30, generates pulse to drive a flip-flop 310 and a signal therefrom actuates a timer 320.

The operating time of timer 320 is set as $t_1 = T/4 + \alpha$ from the cycle period T given in the equation (4).

Hence, after the lapse of time $t_1$, the reactor 340 is driven through a control circuit 330, thereby reducing the exciting voltage given from the inverter 350 to E2 from E1 as above-mentioned.

Next, the movable element 100 turns back in the direction of the arrow A' and the sensor striker 31 redrives the flip-flop 310, and now the timer 320 is bypassed so that the reactor 340 is redriven through the control circuit 330, thereby restoring to E1 the exciting voltage having been reduced to E2.

The above operation is repeated so that the amplitude of vibration is damped as shown in FIG. 4 to thereby stop the moving object 10.

In addition, relay circuits 211 and 221 each serve to drive only the stator generating the thrust in the acceleration direction in a case where the moving object is not stopped at this station, but is merely accelerated.

As seen from the above, the method of the invention can stop the moving object using an inexpensive induction-type linear motor smoothly and accurately at the desired position by use of the extremely simple circuit, thereby being effective in construction of a carrier system low in cost and superior in carrier efficiency.

Also, the method of the invention is free from dust created as in a stopper or a mechanical brake, thereby having the effect of being usable in a clean room or the like.

While a preferred embodiment of the invention has been described using specific terms, such description is for illustrative purpose only, and it is understood that changes and variations may be made without departing from the spirit or scope of the following claims.

What is claimed is:

1. A stop control method for stopping a moving object with a linear motor wherein a pair of stators are disposed in proximity to a stop position for said moving object such that said stop position is positioned longitudinally between said stators, wherein said stop control method comprises the steps of:

applying exciting voltages to said stators, each with an opposite phase and opposite direction of phase rotation; and reducing the amplitude of each of said exciting voltages by a desired magnitude intermittently with a desired timing on the basis of a signal from a movable object detection sensor disposed near said stop position, whereby said moving object is stopped at said stop position without hunting.

* * * * *